United States Patent
Blaiotta

(10) Patent No.: US 12,493,773 B2
(45) Date of Patent: Dec. 9, 2025

(54) DATA AUGMENTATION FOR THE TRAINING OF IMAGE CLASSIFIERS

(71) Applicant: Robert Bosch GmbH, Stuttgart (DE)

(72) Inventor: Claudia Blaiotta, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 608 days.

(21) Appl. No.: 17/742,778

(22) Filed: May 12, 2022

(65) Prior Publication Data

US 2022/0383617 A1  Dec. 1, 2022

(30) Foreign Application Priority Data

May 28, 2021 (DE) .................... 10 2021 205 447.1

(51) Int. Cl.

| | |
|---|---|
| *G06N 3/0455* | (2023.01) |
| *G06T 7/00* | (2017.01) |
| *G06V 10/764* | (2022.01) |
| *G06V 10/77* | (2022.01) |
| *G06V 10/774* | (2022.01) |
| *G06V 10/776* | (2022.01) |

(Continued)

(52) U.S. Cl.
CPC ......... *G06N 3/0455* (2023.01); *G06T 7/0004* (2013.01); *G06V 10/764* (2022.01); *G06V 10/7715* (2022.01); *G06V 10/774* (2022.01); *G06V 10/776* (2022.01); *G06V 10/82* (2022.01); *G06V 20/56* (2022.01); *G06T 2207/20084* (2013.01)

(58) Field of Classification Search
CPC ............. G06N 3/045; G06N 3/0455; G06N 3/02–0985; G06T 7/0002–001; G06T 7/0012; G06T 7/0014; G06T 2207/20081; G06T 2207/20084; G06T 2207/30248–30264; G06V 10/454; G06V 10/82; G06V 20/54; G06V 20/56–588; G06V 2201/08; G06V 10/764; G06V 10/7715; G06V 10/774; G06V 10/776

See application file for complete search history.

(56) References Cited

U.S. PATENT DOCUMENTS

| 12,039,647 B1 * | 7/2024 | Gottlieb | ................. G06N 3/047 |
| 2021/0158075 A1 * | 5/2021 | Shoshan | .............. G06V 10/774 |

(Continued)

OTHER PUBLICATIONS

Barredo-Arrieta, Alejandro, and Javier Del Ser. "Plausible counterfactuals: Auditing deep learning classifiers with realistic adversarial examples." 2020 International joint conference on neural networks (IJCNN). IEEE, 2020. (Year: 2020).*

(Continued)

*Primary Examiner* — Geoffrey E Summers
(74) *Attorney, Agent, or Firm* — NORTON ROSE FULBRIGHT US LLP

(57) ABSTRACT

A method for generating, from an input image, an output image that a given image classifier classifies into a target class chosen from multiple available classes of a given classification. The method includes mapping, using a trained encoder network, the input image to a lower dimensional representation in a latent space; drawing a noise sample from a given distribution; and mapping, using a trained generator network, the noise sample to an output image, wherein this mapping is conditioned both on the target class and on the representation.

12 Claims, 3 Drawing Sheets

(51) Int. Cl.
  *G06V 10/82*   (2022.01)
  *G06V 20/56*   (2022.01)

(56) References Cited

U.S. PATENT DOCUMENTS

2021/0358115 A1* 11/2021 Hever .................. G06T 7/0008
2022/0130143 A1*  4/2022 Rodriguez Lopez .. G06V 10/82

OTHER PUBLICATIONS

Zhu, Jun-Yan, et al. "Toward multimodal image-to-image translation." Advances in neural information processing systems 30 (2017). (Year: 2017).*
Neal, Lawrence, et al. "Open Set Learning with Counterfactual Images." Computer Vision—ECCV 2018: 15th European Conference, Munich, Germany, Sep. 8-14, 2018, Proceedings, Part VI 15. Springer International Publishing, 2018. (Year: 2018).*
Li, Qian, San-Yang Liu, and Xin-She Yang. "Influence of initialization on the performance of metaheuristic optimizers." Applied Soft Computing 91 (2020): 106193. (Year: 2020).*
Chen et al., "Image Generation via Latent Space Learning Using Improved Combination," Neurocomputing, Sciencedirect, 2019, pp. 8-18.
Van Looveren et al., "Conditional Generative Models for Counterfactual Explanations," Cornell University, 2021, pp. 1-11.
Singla et al., "Explaining the Black-Box Smoothly—A Counterfactual Approach," Cornell University, 2021, pp. 1-17.

* cited by examiner

DATA AUGMENTATION FOR THE TRAINING OF IMAGE CLASSIFIERS

CROSS REFERENCE

The present application claims the benefit under 35 U.S.C. § 119 of German Patent Application No. DE 10 2021 205 447.1 filed on May 28, 2021, which is expressly incorporated herein in its entirety.

FIELD

The present invention relates to the automatic generation of images that may, inter alia, be used to augment a training data set for an image classifier.

BACKGROUND INFORMATION

When a vehicle is steered through traffic, optical observation of the environment of the vehicle is the most important source for information that is needed to plan the next actions of the vehicle. This applies to human drivers as well as to systems for at least partially automating the driving. The latter systems usually employ trained image classifiers that map images to classification scores as to which types of objects they contain.

Optical inspection of the geometry and/or surface of a product is another important domain of application for image classifiers. Based on the result, the product may be assigned to one or more predetermined quality classes. In the simplest case, this is a binary classification of the form "OK"/"not OK=NOK".

Image classifiers are usually trained on training images that are labelled with "ground truth" classification scores. The goal of the training is that the image classifier maps the training images to their respective "ground truth" classification scores. If the training is performed with a sufficiently large set of training images that have a sufficient variability, the image classifier can then be expected to correctly classify unseen images as well. The obtaining of the training images is the most expensive part of the training process. In particular, the labelling of the training images is expensive because it frequently involves manual work.

SUMMARY

The present invention provides a method for generating, from an input image x, an output image $x_g$ that a given image classifier classifies into a target class c' chosen from multiple available classes of a given classification.

In accordance with an example embodiment of the present invention, in the course of this method, the input image x is mapped to a lower dimensional representation z in a latent space by a trained encoder network. This latent space may, for example, be defined by a training of the encoder network in conjunction with the training of a decoder that is to reconstruct the original input image x. Such an encoder-decoder structure is called "autoencoder". One type of autoencoders that may advantageously used in the context of the present invention is the variational autoencoder, VAE. The latent space may be understood to be a sub-manifold of a Cartesian space of arbitrary dimensionality. Due to this property, it is typically easier to obtain a sample z from this latent space by taking a sample in the space of input images x and transforming this into the sample z by means of the encoder network than it is to directly find a sample z that belongs to the latent space.

Because the dimensionality of the representation z is lower than the dimensionality of the input image x (and its reconstruction), when computing the representation and then reconstructing the original input image, the information is forced through a "bottleneck". This bottleneck forces the encoder to encode only the information into the representation z that is most important for reconstructing the original image x.

A noise sample n is sampled from a given distribution. By means of a trained generator network, this noise sample n is mapped to an output image $x_g$. This mapping is conditioned both on the target class c' and on the representation z.

Generator networks, such as generator parts of generative adversarial networks, GANs, are known to produce images that belong to a desired domain and are therefore "realistic" in the context of other images belonging to this domain. Further "conditioning" the generation of the output image $x_g$ on some given quantity or property means preferring or even enforcing $x_g$ to be in agreement with the given quantity or property. Conditioning on the target class c' thus prefers or enforces target images $x_g$ that belong to the target class c'. Conditioning on the representation z prefers or enforces output images $x_g$ that are linked to the representation z. In particular, conditioning on the representation z may comprise that the trained generator network produces an output image $x_g$ which the trained encoder network maps to the representation z. That is, the output images $x_g$ are preferred or even enforced to be images which the trained encoder network maps to representations $z_g$ that are as close to z as possible.

The conditioning on the representation z has the effect that when a multitude of output images $x_g$ are produced from one and the same input image x, they will all be of class c', and their most characteristic content, which is most important for reconstructing an image from its representation z, will be quite similar. But all image information that is not part of this most characteristic content is allowed to vary. That is, the randomness of the noise sample n is exploited to selectively produce variability in the parts of the images $x_g$ that contain less important features with respect to any decision boundaries between the target class c' and any other classes.

The generator may employ any suitable method in order to encourage or enforce that the output image $x_g$ is mapped to a representation $z_g$ that is as close to the conditioning z as possible. For example, the generator may create multiple candidate images, map each candidate image to a representation, and choose the candidate image whose representation $z_g$ is closest to z as the output image $x_g$.

This makes the output images $x_g$ particularly useful as training images for image classifiers. During the training, an image classifier may learn confounding correlations between classes and unimportant image features that are in fact unrelated to class membership. For example, if an image classifier is trained to map images of job applicants to particular skills, and some of the persons in the training images wear conspicuous shoulder pads, then the image classifier might at least partially learn a correlation between the easy-to-spot shoulder pads and the skills, rather than the sought correlation between hard-to-spot facial features and the skills. In a training data set that is enriched with generated output images xg, such a confounding correlation is likely to be broken up. The generator will more or less randomly give each person shoulder pads of various sizes and shapes, or no shoulder pad at all, without any correlation to the skill level. In order to achieve a good rating by the classification loss function, the classifier then has no choice but to learn the correlation between facial features and skills.

Classification of objects in traffic scenes is another important use case where confounding correlations may be learned. Besides the traffic-relevant objects, the captured scene usually contains a lot of other information that is not relevant for assessing the traffic situation. For example, if both a particular type of shop and a stop sign are more likely to be found at intersections than in other road sections, the image classifier might correlate image information that belongs to the shop to the semantic meaning of the stop sign. This might cause a stop sign that occurs in a place without this type of shop to be classified as a stop sign with a lesser confidence score, or even to be misclassified as something else. But In a large set of generated output images $x_g$, any traffic sign will be present in combination with all sorts of different backgrounds, so the confounding correlation will be broken up.

Also, the possibility to generate images of arbitrary classes allows to alleviate a class imbalance in the sense that images with some ground truth class labels are underrepresented in the set of training images. For example, a sign that warns a driver of an unsecured level crossing or river bank occurs far less frequently than a stop sign, a yield sign or a speed limit sign. But the frequency with which the signs occur is not correlated with their importance. Missing the detection of a speed limit sign is likely to have far less dangerous consequences than not stopping at a river bank, or not watching for oncoming trains at an unsecured level crossing. With the present method, the set of training images may be augmented with a lot of training images that contain the mentioned rare but important traffic signs.

Training of an image classifier may select, from a combined set of input images x and generates images $x_g$, a subset that has a target amount of variability both in terms of ground truth class labels c (respectively target classes c') and in terms of latent representations z respectively $z_g$. One exemplary way to measure diversity in terms of latent representations z, $z_g$ is to measure, for each representation z, $z_g$, the distance to all other representations z, $z_g$ of input images x, respectively of generated images $x_g$, and to aggregate the results. Such a measure for diversity is tied to the trained encoder. With a different encoder, or a differently trained encoder, the whole structure of the latent space to which the z, $z_g$ belong will be different.

In the end, choosing only a subset of the training images from a large pool that has a large variability may yield a better classification accuracy than using the complete set of training images that has a marked bias of some sort. This is a departure from the usual notion that having more training data is always better than having less training data.

In a further advantageous example embodiment of the present invention, in the course of the mapping of the noise sample n to the output image $x_g$, the output image $x_g$ may be mapped to a classification score c# by a given image classifier. It is determined, by means of a given classification loss function, how good the classification score c# is in agreement with a classification of the output image $x_g$ into the target class c'. At least one input to the generator network is optimized such that re-computation of the output image $x_g$ based on the changed input is likely to cause the value of the classification loss function to improve. In this manner, the generation of the output image $x_g$ may be fine-tuned such that it is more decidedly classified into the target class c'.

In a further particularly advantageous embodiment of the present invention, the input image x is chosen to be of a source class c≠c', thereby making the output image $x_g$ a counterfactual image for the input image x. Such counterfactual images are extremely useful to study the behavior of an image classifier close to a decision boundary between classes.

In a particularly advantageous embodiment of the present invention, the counterfactual image $x_g$ is compared to the input image x. The areas in which the counterfactual image $x_g$ differs from the input image x are determined as areas that are significant with respect to the class boundary between the source class c and the target class c'. It may then be determined whether these areas actually contain information that is relevant to the application at hand.

For example, a classification score outputted by an image classifier during optical inspection of products is not very credible if it turns out that the decision is based on some features in the background of the image that have nothing to do with the product itself. Likewise, if changing some features in a shop window display causes a traffic situation on the road in front of this shop window to be classified differently, there is reasonable doubt whether this classifier is really fit to assess traffic situations correctly. Such a behaviour of an image classifier is somewhat akin to buying product A instead of similar product B for the sole reason that the sales representative for product B is taller than the sales representative for product A.

Also, particularly for the assessment of traffic situations, it is very important to know on which parts of an object an image classifier bases its decision to recognize the presence of this object. In many traffic situations, objects are partially occluded by other objects, but need to be recognized nonetheless. For example, even if an octagonal stop sign is covered by snow, a driver, and also an automated vehicle, is still expected to recognize it and behave accordingly. Also, the timely detection of pedestrians that are about to cross the trajectory of the vehicle critically depends on which parts of the pedestrian need to be visible for the pedestrian to be recognized. Many dangerous situations arise when a pedestrian is wholly or partially occluded by parked cars or other obstacles and suddenly steps into the path of a vehicle. If the image classifier needs at least the head and the two legs to be visible before it recognizes the pedestrian, and the legs are occluded for a long time, the pedestrian may not be recognized until it is too late to avert a collision. By contrast, if the appearing of the head, the torso or an arm already suffices for detecting the pedestrian, much more valuable time is gained for averting the collision.

Therefore, in a further particularly advantageous example embodiment of the present invention, it is determined by a given metric how good the areas that are significant with respect to a class boundary are in agreement with given areas of the input image x that contain features of the input image deemed to be salient. A score that is commensurate with the result outputted by said given metric is attributed to the image classifier. For example, when mass-produced products are optically inspected, the product and the camera will always be in the same spatial arrangement with respect to each other. Therefore, it is known in advance which parts of the acquired image will belong to the product. Likewise, in traffic situations, it is known that the sky does not contain other vehicles to which a car needs to react.

In particular, in the use case of optical inspection, the metric may measure whether the areas that are significant with respect to classifying a product into the class "not OK=NOK", or any other non-optimal class, correspond to areas with concrete defects or deficiencies. This brings the automated optical inspection in line with the manual inspection where a human quality inspector, when asked why a concrete product is to be discarded, is expected to point to particular defects or deficiencies.

The score attributed to the image classifier may be used as feedback to improve the image classifier. Therefore, in a further advantageous embodiment, parameters that characterize the behaviour of the image classifier are optimized such that, when the computation of the counterfactual image $x_g$ and the subsequent evaluation of this counterfactual image $x_g$ are repeated and the score for the image classifier is re-computed, this score is likely to improve.

One use case of this is an application-specific further training of an image classifier that has previously been pre-trained in a more generic manner. For example, an image classifier may be generically trained to detect certain defects or deficiencies, but in a concrete application, it may be trained further to look in the right places that belong to the actual product and not to the background.

As discussed before, the input image x may be an image of a manufactured product that has been acquired in the course of optical inspection of the product, and the classes of the given classification represent quality grades for the product. In another example, the input image x may be an image of a traffic situation, and the classes of the given classification may represent objects that are relevant for the interpretation of the traffic situation.

The present invention also provides a method for training a combination of an encoder network and a generator network for use in the method described above.

In accordance with an example embodiment of the present invention, in the course of this training method, a decoder network is provided. This decoder network is configured to map a lower dimensional representation z in a latent space that has been obtained from the encoder network to a reconstructed image $x_d$ in the domain of original input images x. Parameters that characterize the behaviour of the encoder and decoder networks are then optimized with the goal that the reconstructed image $x_d$ matches the original input image x from which the representation z was obtained. As discussed before, the encoder network and the decoder network then form an autoencoder with an information bottleneck that results in a concentration of the most important image features in the representation z.

Furthermore, a discriminator network is provided. This discriminator network is configured to distinguish whether an image is from the domain of original input images x or from the domain of generated images $x_f$. Also, an image classifier is provided. This image classifier is configured to map the original input image x and the generated image $x_f$ to one or more classes of the given classification. The generated images are also called "fake" images.

The generator network and the discriminator network are adversarially trained. For example, the training may alternate between training of the generator network and training of the discriminator network.

Parameters that characterize the behaviour of the generator network are optimized with the goals that
　the accuracy with which the discriminator network distinguishes between original input images x and generated images $x_f$ decreases,
　the image classifier maps fake (i.e. generated) images $x_f$ to their given target class c, and
　the encoder network 1 maps generated images $x_f$ to the representations z on which their generation was conditioned.

On the other hand, parameters that characterize the behaviour of the discriminator are optimized with the goal that the accuracy with which the discriminator network distinguishes between original input images x and fake images $x_f$ increases.

For example, this adversarial training may be accomplished by optimizing a loss function that comprises
　an adversarial loss that measures the accuracy with which the discriminator network distinguishes between original input images x and generated images $x_f$,
　a classification loss that measures how well the image classifier maps generated images $x_f$ to their given target class c'. For example, this classification loss may be a cross-entropy loss, and
　a representation loss that measures how similar a representation z' to which the generated image $x_f$ is mapped is to the representation z on which generation of this image $x_f$ was conditioned.

The overall goal of the adversarial training is to minimize this combined loss function. Herein, the classification loss only depends on the parameters that characterize the behaviour of the generator network. But the adversarial loss additionally depends on the parameters that characterize the behaviour of the discriminator network. The generator parameters may be optimized to minimize the adversarial loss, and the discriminator parameters may at the same time be optimized to maximize the adversarial loss, or vice versa.

After the adversarial training has been completed, the combination of the encoder network and the generator network may be used, in the method for generating an output image $x_g$ described above, to produce a generated image $x_f$ that may serve as the sought output image $x_g$.

The adversarial training may be performed after said training of the autoencoder. That is, after the autoencoder has been trained, the parameters of the encoder network and decoder network may remain fixed. But the training of the autoencoder and the adversarial training may also be combined into one single training procedure. In this case, it is also possible to use the same network as the decoder network and the generator network. That is, one and the same network may be trained for the decoder objective and for the generator objective. In this manner, the training effort that goes into the decoder network is not "lost" when the decoder network is removed after training. Rather, this effort remains present in the generator network.

In a further advantageous example embodiment of the present invention, the parameters that characterize the behaviour of the encoder network are additionally optimized towards the goal that mutual information between the original input image x and its representation z is maximized. This ensures that the representation z preserves some important attributes of the input image, so that they may be carried over to the generated image $x_f$. This avoids situations where the encoder network and the decoder network accomplish a very good reconstruction of the original input image x at the price that the representation z has little or no visible correlation to the input image x.

Alternatively or in combination, the parameters that characterize the behaviour of the generator network are additionally optimized towards the goal that mutual information between the fake image $x_f$ and the representation z is maximized. This causes attributes from the original input image x that were carried over to the representation z to move on to the generated image $x_f$. In particular, such attributes may be features that are not captured by the class to which the image belongs. Examples of this are image style attributes, such as line thicknesses or colors, that are present across all classes, rather than being tied to specific classes.

In a further advantageous example embodiment of the present invention, the image classifier comprises a trainable network that is configured to map input images x and generated images $x_f$ to a combination of a lower dimensional representation z in the latent space and a classification score c#. Parameters that characterize the behaviour of this trainable network are optimized with the goals that:

the image classifier maps an original input image x to a combination of: a representation z that corresponds to the representation z produced by the encoder network, and a classification score c# that is consistent with a ground truth label c of the input image x; and the image classifier maps a generated image $x_f$ to a combination of: a representation z that corresponds to the representation z on which generation of the image $x_f$ was conditioned, and a classification score c# that is consistent with the target class c' for which the generated image $x_f$ was generated.

In this manner, the image classifier not only provides feedback on the class of the generated image $x_f$. Rather, it also serves to monitor self-consistency in the latent space of representations z.

In accordance with the present invention, the methods described above may be wholly or partially computer-implemented, and thus embodied in software. The present invention therefore also relates to a computer program, comprising machine-readable instructions that, when executed by one or more computers, cause the one or more computers to perform a method described above. In this respect, control units for vehicles and other embedded systems that may run executable program code are to be understood to be computers as well. A non-transitory storage medium, and/or a download product, may comprise the computer program. A download product is an electronic product that may be sold online and transferred over a network for immediate fulfilment. One or more computers may be equipped with said computer program, and/or with said non-transitory storage medium and/or download product.

In the following, the present invention and its preferred embodiments are illustrated using Figures without any intention to limit the scope of the present invention.

DETAILED DESCRIPTION OF EXAMPLE EMBODIMENTS

Figure 1:
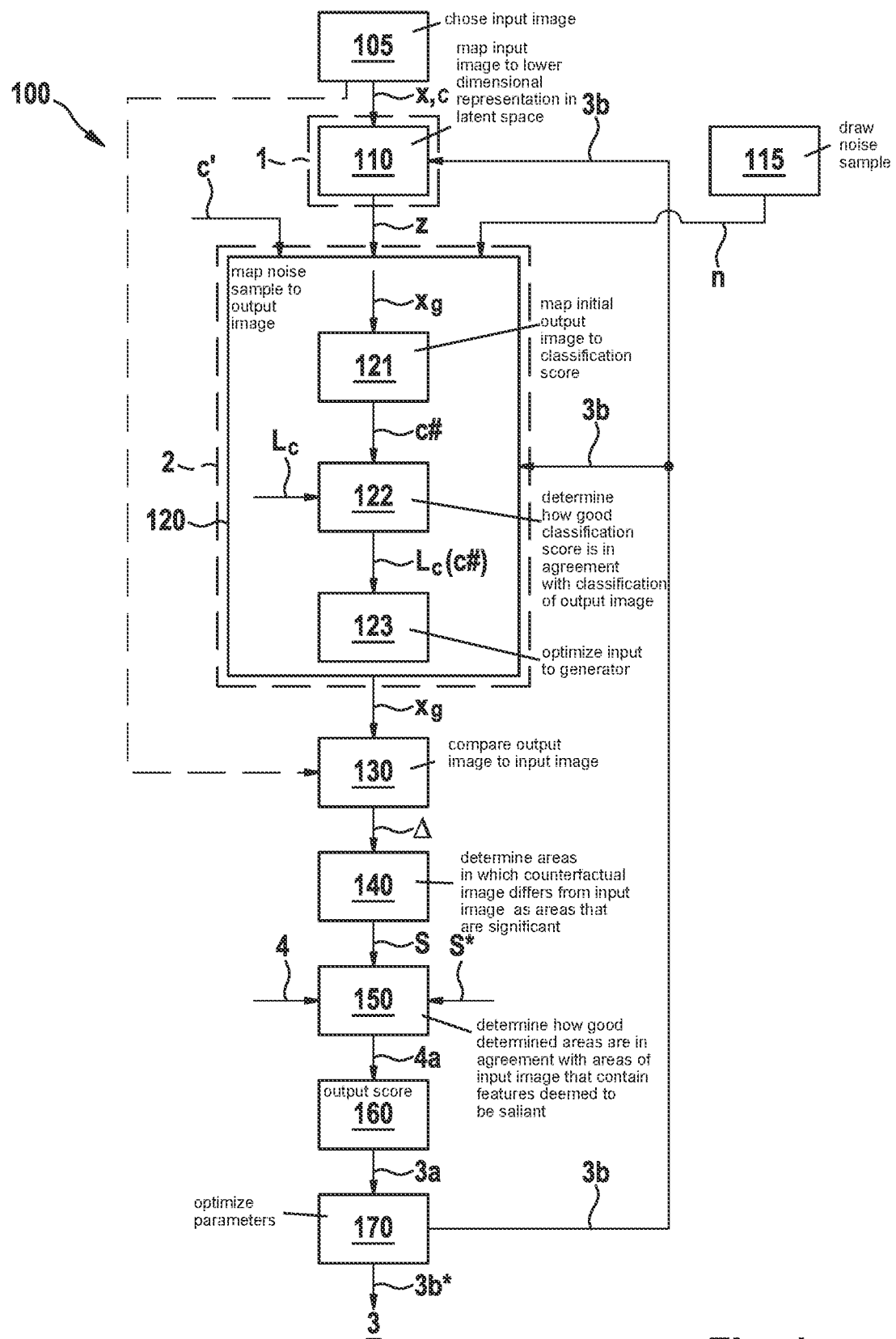
FIG. 1 shows an exemplary embodiment of the method 100 for generating an output image $x_g$, in accordance with the present invention.

FIG. 1 is a schematic flow chart of an embodiment of the method 100 for generating, from an input image x, an output image $x_g$ that a given image classifier 3 classifies into a target class c' chosen from multiple available classes of a given classification. In the example shown in FIG. 1, in step 105, the input image x is chosen to be of a source class c≠c', thereby making the output image $x_g$ a counterfactual image for the input image x. But as discussed before, the method may also be used to produce, based on an input image x of source class c, output images $x_g$ of the same source class c in order to, e.g., augment a set of training images for the image classifier 3.

In step 110, a trained encoder network 1 maps an input image x to a lower-dimensional representation z in a latent space. In step 115, a noise sample n is drawn from a given distribution. In step 120, a trained generator network 2 maps this noise sample n to an output image $x_g$. This mapping is conditioned both on the target class c' and on the representation z. In particular, this conditioning on the representation z may comprise that the trained generator network 2 produces an output image $x_g$ which the trained encoder network 1 maps to the representation z. That is, a representation $z_g$ to which the trained encoder network 1 maps the output image $x_g$ shall be as close to z as possible.

Specifically, the final output image $x_g$ may be obtained by an optimization process. According to block 121, an initial output image $x_g$ may be mapped to a classification score c# by the given image classifier 3. By means of a given classification loss function $L_c$, it may then be determined, according to block 122, how good the classification score c# is in agreement with a classification of the output image $x_g$ into the target class c'. According to block 123, at least one input to the generator network 2 may then be optimized such that re-computation of the output image $x_g$ based on the changed input is likely to cause the value of the classification loss function $L_c$ to improve.

If the output image $x_g$ is a counterfactual image, this may, in step 130, be compared to the input image x. In step 140, areas Δ in which the counterfactual image $x_g$ differs from the input image x are then determined as areas S that are significant with respect to the class boundary between the source class c and the target class c'.

In step 150, it is determined how good these areas S are in agreement with given areas S* of the input image x that contain features of the input image x deemed to be salient. A score 3a that is commensurate with the result 4a outputted by said given metric 4 is attributed to the image classifier 3 in step 160.

In step 170, parameters (3b) that characterize the behaviour of the given image classifier 3 are optimized such that, when the computation of the counterfactual image $x_g$ and in step 120 and the subsequent evaluation of this counterfactual image $x_g$ in steps 130 to 160 are repeated, the score 3a of the image classifier 3 is likely to improve. The finally optimized state of the parameters 3b is labelled with the reference sign 3b*.

Figure 2:
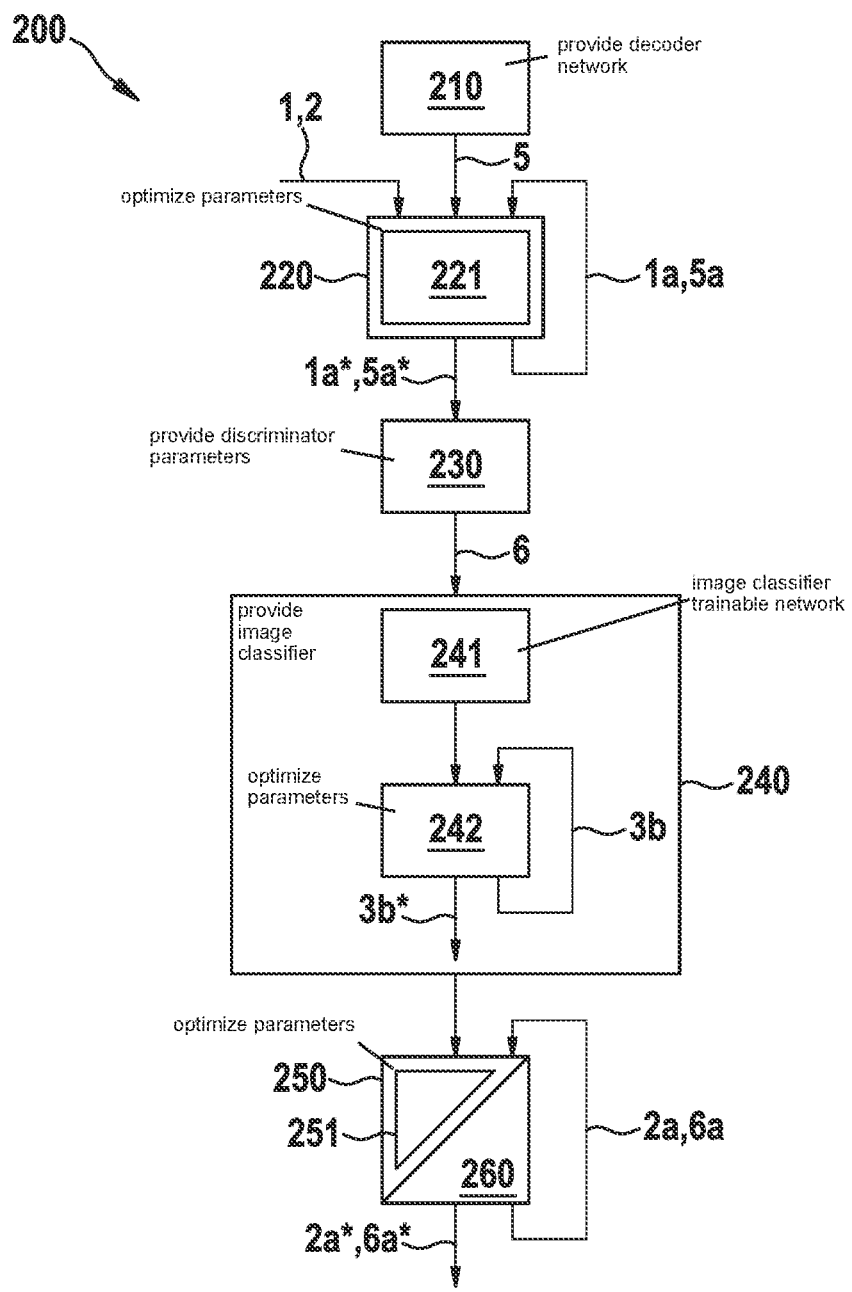
FIG. 2 shows an exemplary embodiment of the method 200 for training a combination of an encoder network 1 and a generator network 2, in accordance with the present invention.

FIG. 2 is a schematic flow chart of an embodiment of the method 200 for training a combination of an encoder network 1 and a generator network 2 for use in the method 100 described above.

In step 210, a decoder network 5 is provided. This decoder network 5 is configured to map a lower dimensional representation z in a latent space that has been obtained from the encoder network 1 to a reconstructed image $x_d$ in the domain of original input images x. In step 220, parameters 1a, 5a that characterize the behaviour of the encoder 1 and decoder 5 networks are optimized with the goal that the reconstructed image $x_d$ matches the original input image x from which the representation z was obtained. In this manner, the encoder 1 and the decoder 5 are trained to become a (variational) autoencoder, (V)AE. The finally optimized states of the parameters 1a and 5a are labelled with the reference signs 1a* and 5a*, respectively. According to block 221, an additional goal of the optimization may be that mutual information between the original input image x and its representation z is maximized.

This image classifier 3 may be fixed and used as-is. But in the embodiment shown in FIG. 2, the image classifier 3 is trained as well. According to block 241, the image classifier 3 may comprise a trainable network that is configured to map input images x and generated images $x_f$ to a combination of a lower dimensional representation z in the latent space and a classification score c#. According to block 242, parameters 3b that characterize the behaviour of this trainable network are optimized with the goals that:

the image classifier 3 maps an original input image x to a combination of: a representation z that corresponds to the representation z produced by the encoder network 1, and a classification score c# that is consistent with a ground truth label c of the input image x; and the image classifier 3 maps a fake image $x_f$ to a combination of: a representation z that corresponds to the representation z on which generation of the fake image $x_f$ was conditioned, and a classification score c# that is consistent with the target class c for which the image $x_f$ was generated.

The finally optimized state of the parameters 3b is labelled with the reference sign 3b*.

In step 250, parameters 2a that characterize the behaviour of the generator network 2 are optimized with the goals that:

the accuracy with which the discriminator network 5 distinguishes between original input images x and fake images $x_f$ decreases, the image classifier 3 maps generated images $x_f$ to their given target class c, and the encoder network 1 maps generated images $x_f$ to the representations z on which their generation was conditioned.

According to block 251, it may be a further optimization goal that that mutual information between the image $x_f$ and the representation z is maximized. The finally optimized state of the parameters 2a is labelled with the reference sign 2a*.

At the same time, in step 260, parameters 6a that characterize the behaviour of the discriminator network 6 with the goal that the accuracy with which the discriminator network 6 distinguishes between original input images x and generated images $x_f$ increases. The finally optimized state of the parameters 6a is labelled with the reference sign 6a*.

That is, the training 250 of the generator network 2 and the training 260 of the discriminator network 6 are performed in an adversarial manner.

Figure 3:
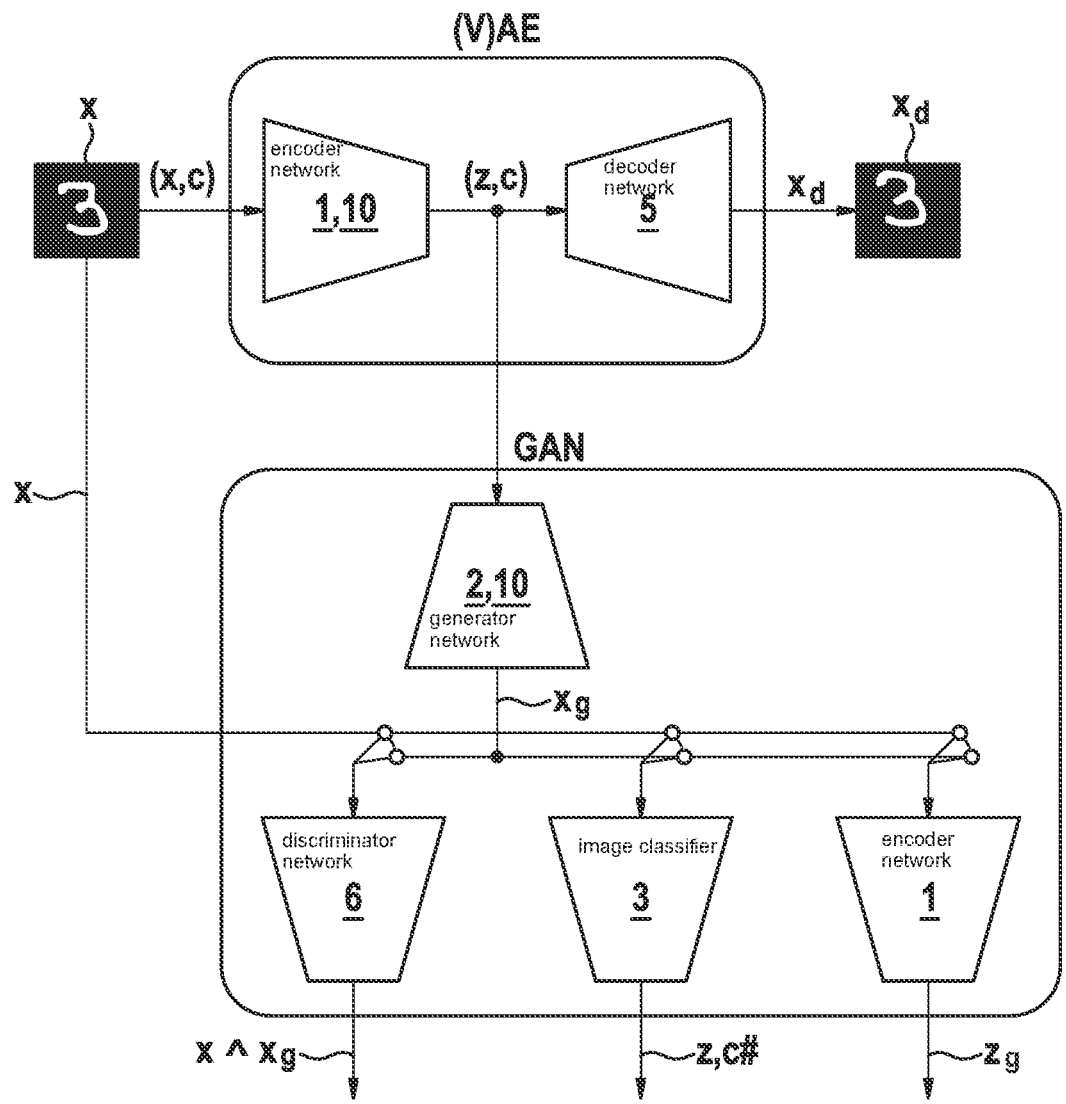
FIG. 3 shows an exemplary embodiment of a configuration for performing the method 200, in accordance with the present invention.

FIG. 3 shows an exemplary configuration that may be used to perform the training method 200 described above. The encoder network 1 and the decoder network 5 form a (variational) autoencoder, (V)AE. The generator network 2 and the discriminator network 6 form a generative adversarial network, GAN. The discriminator network 6 outputs, for each image inputted to it, a classification whether this image is in the domain of original input images x or whether it is a fake image $x_g$. In the embodiment shown in FIG. 3, the image classifier 3 is used to predict not only a classification score c#, but also a lower dimensional representation z that corresponds to the original input image x, or to the generated image $x_g$ respectively. It may therefore be regarded as a part of the GAN. The encoder network 1 and the generator network 2 form the device 10 for generating, from a source image x that is part of a source distribution of images, a target image $x_g$ that is a different sample from the same source distribution.

With the classification score c# outputted by the image classifier 3, it may be supervised how well the fake image $x_g$ conforms to the condition for its generation that is shall belong to class c'. When the fake image $x_g$ is inputted to the trained encoder 1, it may be supervised how well the resulting representation $z_g$ conforms to the condition for the generation of $x_g$ that $z_g$ shall be as similar to z as possible.

What is claimed is:

1. A method for generating, from an input image, an output image that a given image classifier classifies into a target class chosen from multiple available classes of a given classification, comprising the following steps:

mapping, using a trained encoder network, the input image to a lower dimensional representation in a latent space;

drawing a noise sample from a given distribution;

mapping, using a trained generator network, the noise sample to an output image, wherein the mapping is conditioned both on the target class and on the representation, wherein the input image is chosen to be of a source class that is not the same as the target class, thereby making the output image a counterfactual image for the input image;

comparing the counterfactual image to the input image;

determining areas in which the counterfactual image differs from the input image as areas that are significant with respect to a class boundary between the source class and the target class;

determining, using a given metric, how well the areas that are significant with respect to the class boundary are in agreement with given areas of the input image that contain features of the input image deemed to be salient; and attributing, to the image classifier, a score that is commensurate with a result outputted by the given metric.

2. The method of claim 1, wherein conditioning of the mapping on the representation includes that the trained generator network produces as the output image an image which the trained encoder network maps to the representation.

3. The method of claim 1, wherein the mapping of the noise sample to the output image further comprises:

mapping, using the given image classifier, the output image to a classification score;

determining, using a given classification loss function, how good the classification score is in agreement with a classification of the output image into the target class; and optimizing at least one input to the generator network such that re-computation of the output image based on the changed input is likely to cause a value of the classification loss function to improve.

4. The method of claim 1, further comprising:

optimizing parameters that characterize a behaviour of the given image classifier such that, when previous steps of the method are repeated, the score of the image classifier is likely to improve.

5. The method of claim 1, wherein the input image is an image of a manufactured product that has been acquired in a course of optical inspection of the product, and the classes of the given classification represent quality grades for the product.

6. The method of claim 1, wherein the input image is an image of a traffic situation, and the classes of the given classification represent objects that are relevant for an interpretation of the traffic situation.

7. The method of claim 1, wherein:
the lower dimensional representation in the latent space is obtained from the encoder network; and
the encoder network and the generator network that are used are networks that result from a training that includes:
  providing a decoder network that is configured to map the lower dimensional representation in the latent space to a reconstructed image in a domain of original input images;
  optimizing parameters that characterize a behaviour of the encoder network and the decoder network to match the reconstructed image to an original input image from which the representation was obtained;
  providing a discriminator network that is configured to distinguish whether an image is from the domain of the original input images or from a domain of generated images, the image classifier being configured to map the original input images and the generated images to one or more classes of a given classification;
  optimizing parameters that characterize a behaviour of the generator network, by which optimization:
    an accuracy with which the discriminator network distinguishes between original input images and generated images decreases;
    the image classifier maps generated images to their given target class; and
    the encoder network maps generated images to the representations on which their generation was conditioned; and
  optimizing parameters that characterize a behaviour of the discriminator network, by which optimization the accuracy with which the discriminator network distinguishes between original input images and generated images increases.

8. A non-transitory storage medium on which is stored a computer program for generating, from an input image, an output image that a given image classifier classifies into a target class chosen from multiple available classes of a given classification, the computer program, when executed by one or more computers, causing the one or more computers to perform the following steps:
  mapping, using a trained encoder network, the input image to a lower dimensional representation in a latent space;
  drawing a noise sample from a given distribution; and
  mapping, using a trained generator network, the noise sample to an output image, wherein the mapping is conditioned both on the target class and on the representation, wherein the input image is chosen to be of a source class that is not the same as the target class, thereby making the output image a counterfactual image for the input image;
  comparing the counterfactual image to the input image;
  determining areas in which the counterfactual image differs from the input image as areas that are significant with respect to a class boundary between the source class and the target class;
  determining, using a given metric, how well the areas that are significant with respect to the class boundary are in agreement with given areas of the input image that contain features of the input image deemed to be salient; and
  attributing, to the image classifier, a score that is commensurate with a result outputted by the given metric.

9. One or more computers configured to generate, from an input image, an output image that a given image classifier classifies into a target class chosen from multiple available classes of a given classification, the one or more computers configured to:
  map, using a trained encoder network, the input image to a lower dimensional representation in a latent space;
  draw a noise sample from a given distribution; and
  map, using a trained generator network, the noise sample to an output image, wherein the mapping is conditioned both on the target class and on the representation, wherein the input image is chosen to be of a source class that is not the same as the target class, thereby making the output image a counterfactual image for the input image;
  compare the counterfactual image to the input image;
  determine areas in which the counterfactual image differs from the input image as areas that are significant with respect to a class boundary between the source class and the target class;
  determine, using a given metric, how well the areas that are significant with respect to the class boundary are in agreement with given areas of the input image that contain features of the input image deemed to be salient; and
  attribute, to the image classifier, a score that is commensurate with a result outputted by the given metric.

10. A method for generating, from an input image, an output image that a given image classifier classifies into a target class chosen from multiple available classes of a given classification, comprising the following steps:
  mapping, using a trained encoder network, the input image to a lower dimensional representation in a latent space;
  drawing a noise sample from a given distribution;
  mapping, using a trained generator network, the noise sample to an output image, wherein the mapping is conditioned both on the target class and on the representation, wherein:
  the lower dimensional representation in the latent space is obtained from the encoder network; and
  the encoder network and the generator network that are used are networks that result from a training that includes:
    providing a decoder network that is configured to map the lower dimensional representation in the latent space to a reconstructed image in a domain of original input images;
    optimizing parameters that characterize a behaviour of the encoder network and the decoder network to match the reconstructed image to an original input image from which the representation was obtained;
    providing a discriminator network that is configured to distinguish whether an image is from the domain of the original input images or from a domain of generated images, the image classifier being configured to map the original input images and the generated images to one or more classes of a given classification;
    optimizing parameters that characterize a behaviour of the generator network, by which optimization:
      an accuracy with which the discriminator network distinguishes between original input images and generated images decreases;
      the image classifier maps generated images to their given target class; and the encoder network maps generated images to the representations on which their generation was conditioned;

optimizing the parameters that characterize the behavior of the encoder network to maximize mutual information between the original input image and its representation; and optimizing parameters that characterize a behaviour of the discriminator network, by which optimization the accuracy with which the discriminator network distinguishes between original input images and generated images increases.

11. A method for generating, from an input image, an output image that a given image classifier classifies into a target class chosen from multiple available classes of a given classification, comprising the following steps:

mapping, using a trained encoder network, the input image to a lower dimensional representation in a latent space;

drawing a noise sample from a given distribution;

mapping, using a trained generator network, the noise sample to an output image, wherein the mapping is conditioned both on the target class and on the representation, wherein:

the lower dimensional representation in the latent space is obtained from the encoder network; and the encoder network and the generator network that are used are networks that result from a training that includes:

providing a decoder network that is configured to map the lower dimensional representation in the latent space to a reconstructed image in a domain of original input images;

optimizing parameters that characterize a behaviour of the encoder network and the decoder network to match the reconstructed image to an original input image from which the representation was obtained;

providing a discriminator network that is configured to distinguish whether an image is from the domain of the original input images or from a domain of generated images, the image classifier being configured to map the original input imaged and the generated imaged to one or more classes of a given classification;

optimizing parameters that characterize a behaviour of the generator network, by which optimization:

mutual information between the generated image and the representation is maximized;

an accuracy with which the discriminator network distinguishes between original input images and generated images decreases;

the image classifier maps generated images to their given target class; and the encoder network maps generated images to the representations on which their generation was conditioned; and optimizing parameters that characterize a behaviour of the discriminator network, by which optimization the accuracy with which the discriminator network distinguishes between original input images and generated images increases.

12. A method for generating, from an input image, an output image that a given image classifier classifies into a target class chosen from multiple available classes of a given classification, comprising the following steps:

mapping, using a trained encoder network, the input image to a lower dimensional representation in a latent space;

drawing a noise sample from a given distribution;

mapping, using a trained generator network, the noise sample to an output image, wherein the mapping is conditioned both on the target class and on the representation, wherein:

the lower dimensional representation in the latent space is obtained from the encoder network; and the encoder network and the generator network that are used are networks that result from a training that includes:

providing a decoder network that is configured to map the lower dimensional representation in the latent space to a reconstructed image in a domain of original input images;

optimizing parameters that characterize a behaviour of the encoder network and the decoder network to match the reconstructed image to an original input image from which the representation was obtained;

providing a discriminator network that is configured to distinguish whether an image is from the domain of the original input images or from a domain of generated images, the image classifier including a trainable network that, for mapping the original input images and the generated images to one or more classes of a given classification, is configured to map the original input images and the generated images to a combination of the lower dimensional representation in the latent space and a classification score;

optimizing parameters that characterize a behaviour of the generator network, by which optimization:

an accuracy with which the discriminator network distinguishes between original input images and generated images decreases;

the image classifier maps generated images to their given target class; and the encoder network maps generated images to the representations on which their generation was conditioned;

optimizing parameters that characterize a behaviour of the discriminator network, by which optimization the accuracy with which the discriminator network distinguishes between original input images and generated images increases; and optimizing the trainable network, by which optimization the image classifier maps:

an original input image to a combination of: a representation that corresponds to the representation produced by the encoder network, and a classification score that is consistent with a ground truth label of the input image; and a generated image to a combination of: a representation that corresponds to the representation on which generation of the image was conditioned, and a classification score that is consistent with the target class for which the generated image was generated.

* * * * *